United States Patent [19]

Cross

[11] 4,264,755

[45] Apr. 28, 1981

[54] HYDROXY-FUNCTIONAL VINYL COPOLYMERS

[75] Inventor: James M. Cross, New Martinsville, W. Va.

[73] Assignee: Mobay Chemical Corporation, Pittsburgh, Pa.

[21] Appl. No.: 96,128

[22] Filed: Nov. 20, 1979

Related U.S. Application Data

[63] Continuation-in-part of Ser. No. 743,184, Nov. 19, 1976, abandoned, which is a continuation of Ser. No. 638,727, Dec. 8, 1975, abandoned.

[51] Int. Cl.$^3$ .................. C08F 212/08; C08F 216/12; C08F 216/14; C08F 18/10
[52] U.S. Cl. .............................. 526/332; 260/30.4 R; 260/30.4 A; 521/174; 526/87; 526/333; 528/75
[58] Field of Search ..................... 526/332, 333, 87

[56] References Cited

U.S. PATENT DOCUMENTS

| | | | |
|---|---|---|---|
| 3,383,351 | 5/1968 | Stamberger | 260/33.2 |
| 3,652,639 | 3/1972 | Pizzini et al. | 260/465.4 |
| 3,823,201 | 7/1974 | Pizzini et al. | 260/861 |

*Primary Examiner*—Harry Wong, Jr.
*Attorney, Agent, or Firm*—Gene Harsh; Joseph C. Gil; R. Brent Olson

[57] ABSTRACT

The instant invention is directed to novel hydroxy-functional vinyl copolymers. The copolymers diclosed herein are produced by polymerizing styrene in the presence of a mono- or diallyl ether of a saturated aliphatic polyol having a hydroxyl functionality of 3 or 4. The resultant copolymer is characterized as having an OH number of between about 45 and about 100 and a number average molecular weight between about 7000 and about 20,000. The resultant copolymerizate is further characterized as forming a substantially clear, colorless solution with conventional liquid polyether polyols used and known in the polyurethane art.

8 Claims, No Drawings

HYDROXY-FUNCTIONAL VINYL COPOLYMERS

This application is a continuation-in-part of my co-pending application, Ser. No. 743,184 filed Nov. 19, 1976, now abandoned, which in turn is a continuation of application Ser. No. 638,727 filed Dec. 8, 1975, now abandoned.

BACKGROUND OF THE INVENTION

The desirability of preparing compounds containing hydroxyl groups, whereby such materials could be incorporated into other compounds by reaction of the hydroxyl groups, has been widely recognized. Such hydroxyl-containing materials find wide use in the production of polyurethanes and in the production of coating materials curable through the reaction of the hydroxyl groups with such materials as melamine resins and blocked isocyanates.

Graft copolymer dispersions prepared from vinyl monomers and polyether polyols and the use thereof in the preparation of polyurethane polymers are known in the art (see, e.g. U.S. Pat. Nos. 3,383,351; 3,652,639; and 3,823,201). Although these graft copolymers of the prior art impart improved load-bearing properties to polyurethane foams prepared therefrom, they are not true solutions, but are, at best, stable dispersions which, in most cases, eventually separate into two phases.

DESCRIPTION OF THE INVENTION

It has now been found that highly useful hydroxy-functional vinyl copolymers can be prepared by polymerizing styrene in the presence of a mono- or diallyl ether of a saturated aliphatic polyol having a hydroxyl functionality of 3 or 4. The resultant copolymer is characterized as having an OH number of between about 45 and about 100 and a number average molecular weight between about 7000 and about 20,000. The resultant copolymerizate is further characterized as forming a substantially clear, colorless solution in conventional liquid polyether polyols used and known in the polyurethane art. The term, "solution," as used herein is defined as a uniformly dispersed mixture, at the molecular or ionic level, of one or more substances (the solute) in one or more other substances (the solvent). This definition necessarily excludes the colloidal solutions or dispersions of the prior art polymer polyol products.

In general, the copolymers of the instant invention are produced by polymerizing styrene while in the presence of one or more free radical initiator compounds or one or more free radical initiator mixtures with a mono- or diallyl ether of an aliphatic polyol having a hydroxyl functionality of 3 or 4.

The mono- or diallyl ethers usable in the instant invention are free of epoxide chains or repeating ether linkages. The mono- and/or diallyl ethers usable are further characterized as being the mono- or diallyl ethers of a saturated aliphatic polyol having a hydroxyl functionality of 3 or 4, i.e. having 3 or 4 hydroxyl groups per molecule. Specifically usable mono- and diallyl ethers include the mono- and diallyl ethers of glycerol; trimethylolpropane; pentaerythritol; 1,2,3- and 1,2,4-butanetriol; erythritol; 1,3,4,5-hexanetetrol; 1,2,3-, 1,2,4-, 1,2,5- and 2,3,4-hexanetriol; 1,2,3-pentanetriol; trimethylolethane; and the like. The presently preferred ether is the monoallyl ether of trimethylolpropane.

As noted hereinbefore, the novel hydroxy-functional vinyl copolymers are produced by polymerizing styrene in the presence of a mono- and/or diallyl ether of a saturated aliphatic polyol having a hydroxyl functionality of 3 or 4. While it is most preferred that the styrene be the only monomer in addition to the allyl ether, up to about 10 percent by weight based on the amount of styrene of another ethylenically unsaturated monomer may be used. Preferably no more than 5 percent by weight and most preferably no more than 1 percent by weight of additional monomer based on the total of the styrene is included. As indicated above, it is most preferred that no other monomers be used in addition to the allyl ether and the styrene.

Where other monomers are included, they are generally of the type known in the art. Representative ethylenically unsaturated monomers which may be employed in the present invention include butadiene, isoprene, 1,4-pentadiene, 1,6-hexadiene, 1,7-ocadiene, α-methylstyrene, methylstyrene, 2,4-dimethylstyrene, ethylstyrene, isopropylstyrene, butylstyrene, phenylstyrene, cyclohexylstyrene, benzylstyrene and the like; substituted styrenes such as chlorostyrene, 2,5-dichlorostyrene, bromostyrene, fluorostyrene, trifluoromethylstyrene, iodostyrene, cyanostyrene, nitrostyrene. N,N-dimethylaminostyrene, acetoxylstyrene, methyl 4-vinylbenzoate, phenoxystyrene, p-vinyl diphenyl sulfide, p-vinylphenyl phenyl oxide and the like, the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide and the like; the vinyl esters, vinyl ethers, vinyl ketones etc. such as vinyl acetate, vinyl chloroacetate, vinyl alcohol, vinyl butyrates, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ether ketone, vinyl phosphonates such as bis(β-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

The presently preferred additional monomer is acrylonitrile.

In producing the copolymers of the instant invention, a free radical initiator or catalyst is generally used. Illustrative catalysts are the well-known free radical type of vinyl polymerization catalysts, for example, the peroxides, persulfates, perborates, percarbonates, azo-compounds and the like, including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramethane hydroperoxide, diacetyl peroxide, di-α-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, α-methylbenzyl hydroperoxide, α-methyl-ethyl benzyl hydroperoxide, tetralin hydroperoxide, triphenylmethyl-hydroperoxide, diphenylmethyl hydroperoxide, α,α-azo-2-methyl butyronitrile, α,α-2-methyl heptonitrile, 1,1'-azo-1-cyclohexane carbonitrile, dimethyl α,α'-azo-isobutyrate, 4,4'-azo-4-cyanopentanoic acid, azobis-(isobutyronitrile), persuccinic acid, diisopropyl peroxy dicarbonate and the like a mixture of catalysts may also be used. Azobis(isobutyronitrile) is the presently preferred catalyst.

In producing the copolymers of the instant invention the amount of styrene, allyl ether and catalyst may be varied over wide ranges so long as the final product has an hydroxyl number between about 45 and about 100, and preferably between about 60 and about 90, and has a number average molecular weight between about 7000 and about 20,000, preferably between about 10,000 and about 17,000. In general, these criteria will be met by utilizing (a) from about 25 to about 40 percent by weight of styrene, (b) from about 60 to about 75 percent by weight of allyl ether, and (c) from about 0.5 to about 0.8 percent by weight of catalyst, all based on the total weight of (a), (b) and (c). Preferably the styrene comprises from about 25 to about 28 percent by weight, the allyl ether comprises from about 72 to about 75 percent by weight and the catalyst comprises from about 0.5 to about 0.6 percent by weight.

As a general rule, in the synthesis of the vinyl copolymers of this invention, the amount of the free radical initiator compound or free radical initiator mixture used is dependent upon the nature of the free radical initiator itself. Thus, for example, if the free radical initiator selected is a material, such as an azo compound or a peroxide compound, which yields two free radicals per molecule of free radical initiator then the amount used will generally be less than if the free radical initiator yields but one free radical per molecule of free radical initiator.

The temperature employed in effecting the vinyl polymerization is in the range of from about 20° up to about 200° C. Generally, the reaction temperature employed is at least about 50° C., but is usually maintained at a level below about 120° C. When using free radical initiator compounds which are thermally decomposible into the desired free radicals, the temperature maintained in the polymerization reaction zone, is, of course, above the thermal decomposition temperature of the free radical initiator compound. Thus, for example, when employing azo-bis-isobutyronitrile as the free radical initiator a temperature slightly above 100° C. is usually maintained. The operating pressures employed are sufficient to prevent vaporization of the reaction mixture. Normally, such pressures range up to slightly above atmospheric pressure, such as for example 1–2 pounds per square inch up to a few hundred pounds per square inch. In any event, the determination of the appropriate pressure for a given temperature is well within the skill of the art.

The residence time of the reactants in the reaction zone will range from about 30 minutes up to about 30 hours. While reaction times greater than 30 hours can be employed without disadvantage to the process or to the product, there does not appear to be any practical value in maintaining the reaction mixture in the reaction zone longer than 30 hours. Generally, the residence time is at least about 2 hours and normally does not exceed about 24 hours. From the viewpoint of both the time required to effect complete reaction and from the viewpoint of obtaining a more uniform product, it is preferred to effect the polymerization reaction while mixing or stirring the reaction mixture.

A typical method of preparing the vinyl copolymers of this invention is to add at least a portion of the allyl ether to a reaction vessel. The free radical initiator or catalyst and the styrene (and any remaining allyl ether) is then added to the allyl ether in the reaction vessel from separate sources over a period of time while stirring. After complete addition of reactants, stirring is continued for an additional period of time. If a thermally decomposible free radical initiator compound is employed, the temperature of the reaction mixture is, of course, maintained at a level above such thermal decomposition temperature throughout the period of addition and further reaction.

After completion of the polymerization reaction, the solid hydroxyl-containing polyvinyl compound can be recovered by stripping to remove volatile materials by heating, e.g. at a temperature of about 150° C. to 200° C. and under a partial vacuum, if desired. The stripped solids are then subjected to leaching with a solvent, such as methanol, and preferably at an elevated temperature up to the boiling point of the solvent. Usually the leaching is a multi-step operation with the solids being subjected to at least two separate leaching stages. The number of leaching stages employed will, of course, be determined by the efficiency of the leaching operation and the purity of product desired.

If desired, solvents known in the art may also be used during the polymerization. For example, the free radical catalyst may be first dissolved in a solvent such as toluene. However, it is preferred that the polymerization reaction be conducted in the absence of any solvent since the presence of the solvent makes it more difficult to work up the polymerizate since it tends to soften the product.

The vinyl copolymers of the instant invention, as noted above, form substantially clear, colorless solutions with conventional liquid polyether polyols used and known in the polyurethane art. Such polyether polyols generally contain from 2 to 8 hydroxyl groups and have molecular weights of from 800 to 10,000. Such polyethers, as is known in the art, may be obtained by the polymerization of epoxides such as ethylene oxide, propylene oxide, butylene oxide, tetrahydrofuran, styrene oxide or epichlorohydrin in the presence of $BF_3$, or by the chemical addition of these epoxides to starter components containing reactive hydrogen atoms, such as alcohols, amines or water. Examples of such starter components include ethylene glycol, 1,3- or 1,2-propylene glycol, trimethylolpropane, aniline, ammonia, alkanolamines, such as ethanolamine, alkyl diamines such as ethylene diamine, alkylamines and the like. The vinyl copolymers of the instant invention are also soluble in sucrose polyethers of the type generally known in the art. The polyethers preferably used with the vinyl copolymers of the instant invention include those of the type known in which majority of the OH groups are primarily OH groups.

By being able to dissolve the vinyl copolymers of the instant invention in conventional polyethers, many new and unique properties may be imparted to polyurethane foams. Since the vinyl copolymers of the instant invention are soluble, instant and complete reaction with isocyanates to form urethanes is insured.

Thus, it is apparent that when the vinyl copolymers of the instant invention are dissolved in polyether, the resultant solution may be reacted with organic polyisocyanate.

The isocyanates suitable for use in polyurethane production in accordance with the invention include essentially any organic polyisocyanate, such as aliphatic, cycloaliphatic, araliphatic, aromatic and heterocyclic polyisocyanates of the type described for example by W. Siefken in Justus Liebigs Annalen der Chemie, 562 pages 75 to 136. Specific examples include ethylene diisocyanate, 1,4-tetramethylene diisocyanate, 1,6-hexamethylene diisocyanate, 1,12- dodecane diisocyanate, cyclobutane-1,3-diisocyanate, cyclohexane-1,3- and 1,4-diisocyanate and mixtures of these isomers 1- isocyanato-3,3,5-trimethyl-5-isocyanato methyl cyclohexane (German Auslegeschrift No. 1,202,785) 2,4- and 2,6-hexahydrotolylene diisocyanate, and mixtures of these isomers, hexahydro-1,3- and/or 1,4-phenylene diisocyanate, perhydro-2,4' and/or 4,4'-diphenyl methane diisocyanate, 1,3- and 1,4-phenylene diisocyanate, 2,4- and 2,6-tolylene diisocyanate and mixtures of these isomers; diphenyl methane 2,4'- and/or 4,4'-diisocyanate naphthylene-1,5-diisocyanate, triphenyl methane-4,4',4''-triisocyanate, polyphenyl-polymethylene polyisocyanates, of the type obtained by condensing aniline with formaldehyde, followed by phosgenation and described, for example, in British Pat. Nos. 874,430 and 848,671; perchlorinated aryl polyisocyanates of the type described, for example, in German Auslegeschrift No. 1,157,601, polyisocyanates containing carbodiimide groups of the type described in German Pat. No. 1,092,007; diisocyanates of the type described in U.S. Pat. No. 3,492,330; polyisocyanates containing allophanate groups of the type described for example in British Pat. No. 994,890, Belgium Pat. No. 761,626 and published Dutch patent application No. 7,102,524; polyisocyanate containing isocyanurate groups of the type described, for example, in German Pat. Nos. 1,022,789; 1,222,067 and 1,027,394 and in German Offenlegungsschrift Nos. 1,929,034 and 2,004,048 polyisocyanates containing urethane groups of the type described for example in Belgian Pat. No. 752,261 or in U.S. Pat. No. 3,394,164; polyisocyanates containing acylated urea groups according to German Pat. No. 1,230,778; polyisocyanates containing biuret groups of the type described, for example, in German Pat. No. 1,101,394, British Pat. No. 889,050 and French Pat. No. 7,017,514; polyisocyanates obtained by telomerization reactions of the type described, for example, in Belgian Pat. No. 723,640; polyisocyanates containing ester groups of the type described, for example, in British Pat. Nos. 965,474 and 1,072,956, U.S. Pat. No. 3,567,763 and German Pat. No. 1,231,688 and reaction products of the aforementioned isocyanates with acetals according to German Pat. No. 1,072,385.

It is also possible to use the isocyanate group-containing distillation residues accumulating in the production of isocyanates on an industrial scale, optionally in solution in one or more of the aforementioned polyisocyanates. It is also possible to use mixtures of the aforementioned polyisocyanates.

In general, it is preferred to use readily available polyisocyanates, such as 2,4- and 2,6-tolylene diisocyanate, and mixtures of these isomers ("TDI"); polyphenyl-polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates").

Examples of the many types of compounds suitable for use in producing polyurethane foams in accordance with the invention are described for example, in High Polymers, Vol. XVI. "Polyurethanes, Chemistry and Technology," by Saunders and Frisch, Interscience Publishers, New York, London, Vol. I, 1962, pages 32 to 42 and pages 44 to 54, and Vol. II, 1964, pages 5 to 6 and 198 to 199 and also in Kunststoff-Handbuch, Vol. VII, Vieweg-Hochtlen, Carl-Hanser-Verlag, Munich 1966, for example on pages 45 to 71.

In many instances, catalysts may also be used to produce the polyurethanes used herein. Suitable catalysts include tertiary amines, such as triethyl amine, tributyl amine, N-methyl morpholine, N-ethyl morpholine, N-coco morpholine, N,N,N',N'-tetramethyl ethylene diamine, 1,4-diazabicyclo-(2,2,2)-octane, N-methyl-N'-dimethyl amino ethyl piperazine, N,N-dimethyl benzyl amine, bis-(N,N-diethyl amino ethyl)-adipate, N,N-diethyl benzyl amine, pentamethyl diethylene triamine, N,N-dimethyl cyclohexyl amine, N,N,N',N'-tetramethyl-1,3-butane diamine, N,N-dimethyl-$\beta$-phenyl ethyl amine, 1,2-dimethyl imidazole and 2-methyl imidazole.

Tertiary amines containing isocyanate-reactive hydrogen atoms may also be used and include triethanolamine, triisopropanolamine, N-methyl-diethanolamine, N-ethyl-diethanolamine, N,N-dimethyl ethanolamine and their reaction products with alkylene oxides, such as propylene oxide and/or ethylene oxide.

Other suitable catalysts include silaamines with carbon-silicon bonds of the type described in German Pat. No. 1,229,290. Specific examples include 2,2,4-trimethyl-2-silamorpholine and 1,3-diethylaminomethyl tetramethyl disiloxane.

Other suitable catalyst include nitrogen-containing bases, such as tetraalkyl ammonium hydroxides. Alkali hydroxides such as sodium hydroxide, alkali phenolates, such as sodium phenolate or alkali alcoholates, such as sodium methylate, and hexahydrotriazines may also be used as catalysts.

Organo metallic compounds, especially organo tin compounds, may also be used as catalyst. Preferred organo tin compounds are tin (II) salts of carboxylic acids, such as tin (II) acetate, tin (II) octoate, tin (II) ethyl hexoate and tin (II) laurate, and the dialkyl tin salts of carboxylic acids, such as dibutyl tin diacetate, dibutyl tin dilaurate, dibutyl tin maleate or dioctyl tin diacetate.

Further examples of catalysts suitable for use in accordance with the invention and details on the way in which the catalysts work may be found in Kunststoff-Handbuch, Vol. VII, published by Vieweg and Hochtlen, Carl-Hanser-Verlag, Munich, 1966, for example on pages 96 to 102.

The catalysts are generally used in a quantity of from about 0.001 to 10% by weight, based on the quantity of the organic compounds containing at least two isocyanate-reactive hydrogen atoms with a molecular weight of from 400 to 10,000.

It is also possible to use reaction retarders such as acid-reacting substances, e.g. hydrochloric acid or organic acid halides in producing the polyurethane component. Pigments or dyes and flameproofing agents such as tris-chloroethyl phosphate or ammonium phosphate and polyphosphate, stabilizers against ageing and weathering, plasticizers, fungistatic and bacteriostatic compounds and fillers, such as barium sulphate, kieselguhr, carbon black or whiting, may also be used.

Other examples of reaction retarders, stabilizers, flameproofing agents, plasticizers, dyes, fillers and fungistatic and bacteriostatic compounds optionally used in accordance with the invention, and also details on the way additives of this type are used and the way in which they work, may be found in Kunststoff-Handbuch, Vol. VII, published by Vieweg-Hochtlen, Carl-Hauser-Verlag, Munich, 1966, for example; on pages 103 to 113.

The reaction components of the polyurethane can be reacted by the one-stage process, by the prepolymer process or by the semi-prepolymer process. In many cases machines, of the type described in U.S. Pat. No. 2,764,565 are used. Particulars of processing machines which may also be used in accordance with the invention may be found in Kunststoff Handbuch, Vol. VI, published by Vieweg and Hochtlen, Carl-Hanser-Verlag, Munich, 1966, for example on pages 121-205.

While the compositions of the instant invention are eminently suitable for use in producing polyurethane foams, they may also be used in producing polyurethane coatings in monomers well known in the art.

In order to illustrate this invention in greater detail, reference is made to the following examples. Unless otherwise specified, all parts and percentages in the Examples are by weight.

EXAMPLES 1 THROUGH 4

The hydroxy functional vinyl copolymers of these examples were produced utilizing the monoallyl ether of trimethylolpropane, styrene and azobisisobutyronitrile in the amounts set forth in Table I. The general procedure followed in producing the vinyl copolymers of these examples is as follows.

A solution of the monoallyl ether and azobisisobutyronitrile was prepared using the amounts of materials specified in Table I. This solution is prepred by heating the mixture of catalyst crystals and monoallyl ether to 65°-70° C. with stirring until solution is complete. The solution is then cooled to room temperature.

The monoallyl ether in the amount specified in Table I is then charged to a reactor equipped with a nitrogen sparge and is heated to about 110° C. The catalyst solution and the styrene are then added continuously over a period of about six hours to the reactor. The reactor temperature is maintained at about 110° C. during this addition. At the end of about six hours (i.e. after the addition is complete), the reaction mixture is held an additional 25 hours at 110° C. At the end of this time the product remains a clear solution. This clear solution is now ready for work-up.

The product above is added slowly to about 2800 parts of cold methanol. The methanol is stirred well during this addition with good cooling of the methanol mixture. The polymer solution is kept at approximately 100°-110° C. during this addition so that it will remain in solution. After the addition is complete, the temperature is dropped to 15°-20° C. The crystals of polymer are separated by filtration and the filtrate saved. The crystals are immediately reslurried with methanol, stirred for about 30 minutes and again filtered. The polymer crystals are low melting prior to the first wash, hence it is advisable not to permit them to warm up before washing. The crystals are washed once more with methanol. After this, the crystals are vacuum dried at 60° C. (they may also be air dried by spreading in a large metal tray). The filtrates are combined and the methanol removed by distillation. The residue (monoallyl ether and low molecular weight oligomers) can then be saved for the next charge. The methanol is collected and may then be used for the next work-up.

TABLE I

| Ex. | Parts Precharged monoallyl ether | Parts monoallyl ether + azobisisobutyronitrile | Parts styrene | Parts Product | OH No. of product | Melting point product |
|---|---|---|---|---|---|---|
| 1 | 1077 | 523 + 11 | 534 | 409 | 88.1 | 107–128° C. |
| 2 | 544 | 523 + 11 | 534 | 451 | 76.3 | 110–133° C. |
| 3 | 544 | 523 + 7 | 534 | 408 | 75.1 | 112–133° C. |
| 4 | 277 | 523 + 11 | 534 | 483 | 67.2 | 110–134° C. |

In each of the above cases, a 16% solution of the vinyl polymer in a conventional polyether polyol was made up and tested. The polyether polyol used was a trifunctional polyether polyol of molecular weight of about 6000 based on trimethylolpropane, ethylene oxide and propylene oxide. The viscosities of the solutions were as indicated in Table II, and were run at 22° C., using a Brookfield viscosimeter with a No. 3 spindle at 6 RPM. The resultant solutions were then formulated to produce resilient foams as indicated in Table II (all parts being by weight).

In producing the foams, the polyether polyol, the vinyl polymer solution, the stabilizer and the dibutyl tin dilaurate were mixed thoroughly using a high speed turbine agitator. The water solution was then stirred vigorously into the resin mixture. Finally, the isocyanate was mixed into the solution over a period of 8 to 10 seconds.

The reacting mixture was quickly poured into an aluminum mold. The mold was quickly clamped shut and allowed to stand at ambient conditions for 15 minutes to allow the foam to rise and fill the mold and cure. The mold was opened and the foam removed and compressed twice to 75% of its height. The foam blocks were then allowed to age for 3 days at room temperature at a relative humidity of 30 percent.

TABLE II

| Example/ | 1 | | | 2 | | | 3 | | | 4 | | |
|---|---|---|---|---|---|---|---|---|---|---|---|---|
| Formulation | A | B | C | A | B | C | A | B | C | A | B | C |
| Polyether Polyol | — | 60 | 80 | — | 60 | 80 | — | 60 | 80 | — | 60 | 80 |
| Vinyl Polymer 16% solution | 225 | 165 | 145 | 225 | 165 | 145 | 225 | 165 | 145 | 225 | 165 | 145 |
| Silicone Stabilizer (L-5303 available from Union Carbide) | 1 | 1 | 1 | 1 | 1 | 1 | 1 | 1 | 1 | 1 | 1 | 1 |
| Dibutyl Tin Dilaurate | 0.06 | 0.06 | 0.06 | 0.06 | 0.06 | 0.06 | 0.06 | 0.06 | 0.06 | 0.06 | 0.06 | 0.06 |
| $H_2O$, catalyst* | 7.3 | 7.3 | 7.3 | 7.3 | 7.3 | 7.3 | 7.3 | 7.3 | 7.3 | 7.3 | 7.3 | 7.3 |
| Isocyanate*[1] | 83.5 | 83 | 83 | 83.5 | 83 | 83 | 83.5 | 83 | 83 | 83.5 | 83 | 83 |
| % by weight hydroxy-containing vinyl polymer | 11.36 | 8.34 | 7.33 | 11.36 | 8.34 | 7.33 | 11.36 | 8.34 | 7.33 | 11.36 | 8.34 | 7.33 |
| viscosity of 16% solution | 8140 cps | | | 8640 cps | | | 8560 cps | | | 9000 cps | | |

*377 parts $H_2O$; 16.8 parts triethylene diamine; 13.7 parts of $(CH_3)_2-N-CH_2-CH_2-O-CH_2-CH_2-N-(CH_3)_2$; 42.3 parts of a Mannich base (available from Union Carbide as A-4)

*[1] An isocyanate blend of 80% by weight tolylene diisocyanate and 20% by weight of a polyphenyl polymethylene polyisocyanate having a diisocyanate content of about 55%.

The foam formulations were then tested for % indentations at 12#/16 in.$^2$ and at 30#/16 in.$^2$. The foam blocks tested measured $8'' \times 8\frac{3}{4}'' \times 4\frac{1}{2}''$. The $8'' \times 8\frac{3}{4}''$ face was placed upon a flat surface and a $4'' \times 4''$ (16 square inches) flat plate was brought into contact with the top surface of the test block. Vertical force was delivered to the center of the plate to compress the test block under the plate 75% of its height twice for one second.

Five minutes after removal from compression the test block thickness was measured at zero pressure. A force of 12 pounds was then applied to the test block by means of weights on the 16 square inch plate. The force was allowed to continue for one minute and then the indentation distance was measured and the percent indentation calculated and reported.

After removal of the 12 pounds, immediately 30 pounds were applied to the pressure plate and again after one minute the indentation distance was measured and the percent indentation calculated and reported. The results were as indicated in Table III.

TABLE III

| | OH # of vinyl copolymer | % indent 12#/16 in$^2$ | | | % indent 30#/16 in$^2$ | | |
|---|---|---|---|---|---|---|---|
| | | A | B | C | A | B | C |
| 1 | 88.1 | 2.6 | 4.4 | 5.3 | 18.4 | 28.9 | 31.6 |
| 2 | 76.32 | 3.5 | 4.4 | 4.4 | 23.7 | 32.7 | 32.3 |
| 3 | 75.13 | 3.5 | 5.3 | 5.3 | 24.6 | 36.8 | 37.2 |
| 4 | 67.17 | 5.5 | 5.3 | 6.2 | 28.2 | 36.2 | 38.1 |

EXAMPLE 5

3200 parts of the diallylether of trimethylolpropane were charged to reactor while heating to 110° C., the reactor being equipped with a nitrogen sparge. In two separate streams, 1068 parts of styrene and a mixture made from 22 parts of azobisisobutyronitrile and 200 parts of the diallyl ether were slowly added to the reactor over a period of two hours. The reaction mixture was then held at 110° C. for about 24 hours. The resultant product when isolated in the monomer above, was completely soluble in the polyether polyol of Examples 1-4 and had an OH number of 52.5.

What is claimed is:

1. A hydroxyl functional vinyl copolymer having a number average molecular weight of between about 7,000 and about 20,000 produced by the process comprising reacting:
   (a) from about 25 to about 40% by weight styrene,
   (b) up to about 10% by weight based on the styrene of another ethylenically unsaturated monomer, and
   (c) from about 60 to 75% by weight of a mono- or diallyl ether of a saturated aliphatic polyol having a hydroxyl functionality of 3 or 4 in the presence of
   (d) from about 0.5 to about 0.8% by weight of a free radical catalyst, said copolymer having an OH number of between about 45 and about 100, the percent by weight of (a), (c) and (d) being based on the total weight of (a), (c) and (d), said process further characterized in that at least a portion of component (c) is first added to the reaction vessel and thereafter components (a), (b) and (d) and any remaining portion of component (c) are added to the reaction vessel.

2. The copolymer of claim 1 wherein component (b) consists of no more than 5 percent by weight based on styrene.

3. The copolymer of claim 1 wherein component (c) is the monoallyl ether of trimethylolpropane.

4. The copolymer of claim 3 wherein component (b) is acrylonitrile.

5. A process for making the hydroxyl functional vinyl copolymer having a number average molecular weight of between about 7,000 and about 20,000 and having an OH number between about 45 and about 100 comprising reacting:
   (a) from about 25 to about 40% by weight styrene,
   (b) up to about 10% by weight based on styrene of another ethylenically unsaturated monomer, and
   (c) from about 60 to 75% by weight of a mono- or diallyl ether of a saturated aliphatic polyol having a hydroxy functionality of 3 or 4 in the presence of
   (d) from about 0.5 to about 0.8% by weight of a free radical catalyst, wherein the percent by weight of (a), (c) and (d) are based on the total weight of (a), (c) and (d), said process further characterized in that at least a portion of component (c) is first added to a reaction vessel and thereafter components (a), (b) and (d) and any remaining portion of component (c) are added to the reaction vessel.

6. The process of claim 5 wherein component (b) consists of no more than 5 percent by weight based on styrene.

7. The process of claim 5 wherein component (c) is the monoallyl ether of trimethylolpropane.

8. The process of claim 7 wherein component (b) is acrylonitrile.

* * * * *